(12) United States Patent
Tsirkin

(10) Patent No.: US 10,514,942 B2
(45) Date of Patent: Dec. 24, 2019

(54) USING LINKER SCRIPTS FOR LOADING SYSTEM CONFIGURATION TABLES

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 443 days.

(21) Appl. No.: 14/187,399

(22) Filed: Feb. 24, 2014

(65) Prior Publication Data

US 2015/0242221 A1    Aug. 27, 2015

(51) Int. Cl.
*G06F 9/455*    (2018.01)

(52) U.S. Cl.
CPC .............. *G06F 9/45558* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 7,356,679 B1* | 4/2008 | Le | ............ | G06F 9/45558 713/1 |
| 8,490,089 B2 | 7/2013 | Friebel et al. | | |
| 8,793,465 B1* | 7/2014 | Forgette | ............ | G06F 12/1036 711/201 |
| 2003/0236577 A1* | 12/2003 | Clinton | ............ | G06F 8/51 700/10 |
| 2006/0159007 A1* | 7/2006 | Frutiger | ............ | H04L 41/0806 370/216 |
| 2010/0281273 A1 | 11/2010 | Lee et al. | | |
| 2011/0161955 A1 | 6/2011 | Woller et al. | | |
| 2012/0174097 A1 | 7/2012 | Levin | | |
| 2013/0007435 A1* | 1/2013 | Bayani | ............ | G06F 9/4401 713/2 |
| 2013/0151569 A1 | 6/2013 | Therien et al. | | |
| 2013/0151831 A1 | 6/2013 | Bealkowski et al. | | |
| 2014/0006759 A1* | 1/2014 | Hashiguchi | ............ | G06F 9/4486 712/234 |
| 2014/0064246 A1* | 3/2014 | Baillargeon | ............ | H04L 61/2592 370/331 |

OTHER PUBLICATIONS

Acpica.org, "Summary of Changes for Version 20130517", May 17, 2013, 217 Pages https://acpica.org/sites/acpica/files/changes_1.txt.

(Continued)

*Primary Examiner* — Wynuel S Aquino
*Assistant Examiner* — Melissa A Headly
(74) *Attorney, Agent, or Firm* — Lowenstein Sandler LLP

(57) ABSTRACT

Systems and methods for using linker scripts for loading system configuration tables. An example method may comprise: packaging, by a host computer system, a first system configuration table and a second system configuration table into one or more memory image files; providing a script comprising a first instruction to load the memory image files into a memory of a virtual machine being executed by the host computer system, the script further comprising a second instruction to resolve, in view of a base address, a reference by the first system configuration table to the second system configuration table; and providing the memory image files and the script to the virtual machine.

14 Claims, 4 Drawing Sheets

(56) References Cited

OTHER PUBLICATIONS

Dall, Christopher and Nieh, Jason, "KVM/ARM: Experiences Building the Linux ARM Hypervisor", Department of Computer Science, Columbia University, Technical Report CUCS-010-13, Apr. 2013 http://academiccommons.columbia.edu/download/fedora_content/download/ac:162689/CONTENT/Dall_Nieh_2013_tech_report.pdf.

Tsirkin, Michael S., "Patchwork [v2,4/5] ACPI:Load and Link Tables from /eTC/ACPI/", http://patchwork.ozlabs.org/patch/257343/ Jul. 7, 2013.

Tsirkin, Michael S., "Re: [Qemu-devel] [SeaBIOS] [PATCH v2 414] 1388: ACPI Table Generation Co", https://lists.gnu.org/archive/html/qemu-devel/2013-07/msg01335.html Jul. 8, 2013.

Tsirkin, Michael S., "[PATCH v2 Repost 0/9] QEMU: Generate ACPI Tables for the Guest", http://comments.gmane.org/gmane.comp.emulators.qemu/221539 Jul. 10, 2013.

Tsirkin, Michael S., "[Qemu-devel] [PATCH v7 17/27] i386: Add Bios Linker/Loader", Oct. 2013, 6 Pages http://lists.gnu.org/archive/html/qemu-devel/2013-10/msg00190.html.

* cited by examiner

USING LINKER SCRIPTS FOR LOADING SYSTEM CONFIGURATION TABLES

TECHNICAL FIELD

The present disclosure is generally related to computer systems, and is more specifically related to systems and methods for using linker scripts for loading system configuration tables.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware. In certain implementations, the hypervisor may virtualize the physical hardware by presenting a virtual machine with one or more virtual devices emulating corresponding physical devices.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for using linker scripts for loading system configuration tables. An operating system may utilize one or more system configuration tables to store configuration parameters of the underlying hardware. In virtualized environments, certain system configuration tables may be created by the hypervisor and made available to one or more virtual machines, thus presenting the abstraction of the hardware layer to the virtual machines.

In certain implementations, system configuration tables may conform to the Advanced Configuration and Power Interface (ACPI) Specification that defines an open standard for device configuration and power management functions by an operating system, including definitions of several system configuration tables.

Certain system configuration tables may reference other configuration tables. For example, according to the ACPI Specification, the Root System Descriptor Pointer (RSDP) may reference the Extended System Descriptor Table (XSDT) which, in turn, may include pointers other description tables, e.g., the Fixed ACPI Description Table (FADT). The latter may point to the Differentiated System Description Table (DSDT).

In a virtualized environment, one or more system configuration tables may be provided to a virtual machine by the hypervisor. However, as base addresses of system configuration tables may not be known before the memory buffers for those tables are allocated in the virtual machine address space, references to those tables may need to be resolved at the time of loading the table that contains such references.

Furthermore, a configuration table may comprise a checksum of the table contents. Hence, modifying one or more pointers contained by a configuration table may invalidate the checksum.

Aspects of the present disclosure address the above noted issues by providing a method of creating a linker script to be executed by a virtual machine to resolve the references, adjust the checksums, and load the system configuration tables into the virtual machine memory. In an illustrative example, the hypervisor may supply to a virtual machine one or more system configuration tables and a linker script. The latter may comprise instructions to load the configuration tables into the virtual machine memory, resolve the inter-table references in view of the base addresses of the memory buffers allocated to store the configuration tables, and adjust the table checksum values to reflect the modified inter-table pointers.

Various aspects of the above referenced methods and systems are described in details herein below by way of examples, rather than by way of limitation.

Figure 1:
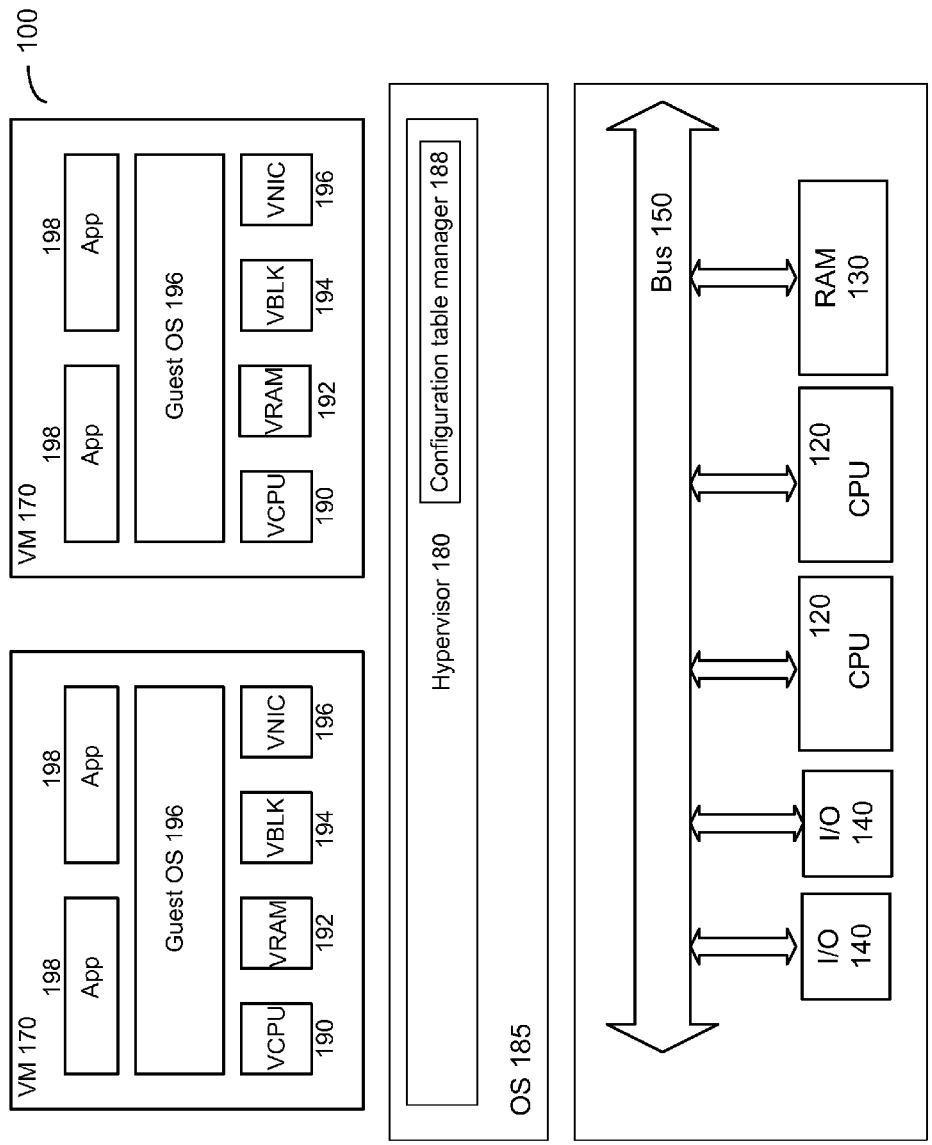
FIG. 1 depicts a high-level component diagram of an example computer system, in accordance with one or more aspects of the present disclosure.

FIG. 1 depicts a high-level component diagram of an illustrative example of a host computer system 100 that may be programmed to perform the method of using linker scripts for loading system configuration tables, in accordance with one or more aspects of the present disclosure. Host computer system 100 may comprise one or more physical processors 120 communicatively coupled to memory devices 130 and input/output (I/O) devices 140 via a system bus 150.

"Processor" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Host computer system 100 may run multiple virtual machines 170, by executing a software layer 180, often referred to as "hypervisor," above the hardware and below the virtual machines, as schematically illustrated by FIG. 1. In one illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices. A virtual machine 170 may execute a guest operating system 196 which may utilize the underlying virtual processors 190, virtual memory 192, and virtual I/O devices 194, 196. One or more applications 198 may be running on a virtual machine 170 under the guest operating system 196.

In accordance with one or more aspects of the present disclosure, host computer system 100 may comprise a configuration table manager 188 programmed to create one or more system configuration tables (e.g., ACPI tables) for one or more virtual machines. In certain implementations, configuration table manager 188 may be implemented as a software component invoked by hypervisor 180. Alternatively, functions of configuration table manager 188 may be performed by hypervisor 180.

In an illustrative example, the system configuration tables may reflect the hardware configuration of host computer system 100, including the memory configuration, the I/O devices, the Peripheral Component Interconnect (PCI) bus configuration, etc. In another illustrative example, the system configuration tables may also reflect the configuration of the hardware to be exposed to a particular virtual machine, when such configuration is different from the hardware configuration of the host computer system executing the virtual machine (for example, certain processors, physical memory ranges, and/or I/O devices of the host computer system may be excluded from the hardware configuration exposed to a virtual machine). In another illustrative example, the system configuration tables may also reflect the current values of configuration parameters of the hardware devices exposed to a particular virtual machine, the hardware device orderings and/or priorities, etc.

Upon creating one or more system configuration tables, host computer system 100 may package the system configuration tables into one or more memory image files (also referred to as ROM files). Host computer system 100 may further generate a linker script to be executed by the virtual machine upon the virtual machine startup. The linker script may comprise a plurality of instructions to load the configuration tables into the virtual machine memory, resolve the inter-table references in view of the base addresses of the memory buffers allocated to store the configuration tables, adjust the table checksum values to reflect the modified inter-table pointers, and/or perform other actions, as described in more details herein below.

The linker script may comprise one or more instructions defining how the configuration tables should be loaded to the virtual machine memory. In an illustrative example, the instructions may define the order in which the configuration tables should be loaded. In another illustrative example, the instructions may define the required alignment of the base addresses of one or more configuration tables. In another illustrative example, the instructions may define the memory zone into which one or more configuration tables should be loaded. The memory zone may specify the memory address range (e.g., FSEG memory zone, low 16-bit memory, 32-bit memory, or 64-bit memory), and how BIOS would present the allocated address ranges to the operating system (e.g., reserved memory or ACPI memory).

Figure 2:
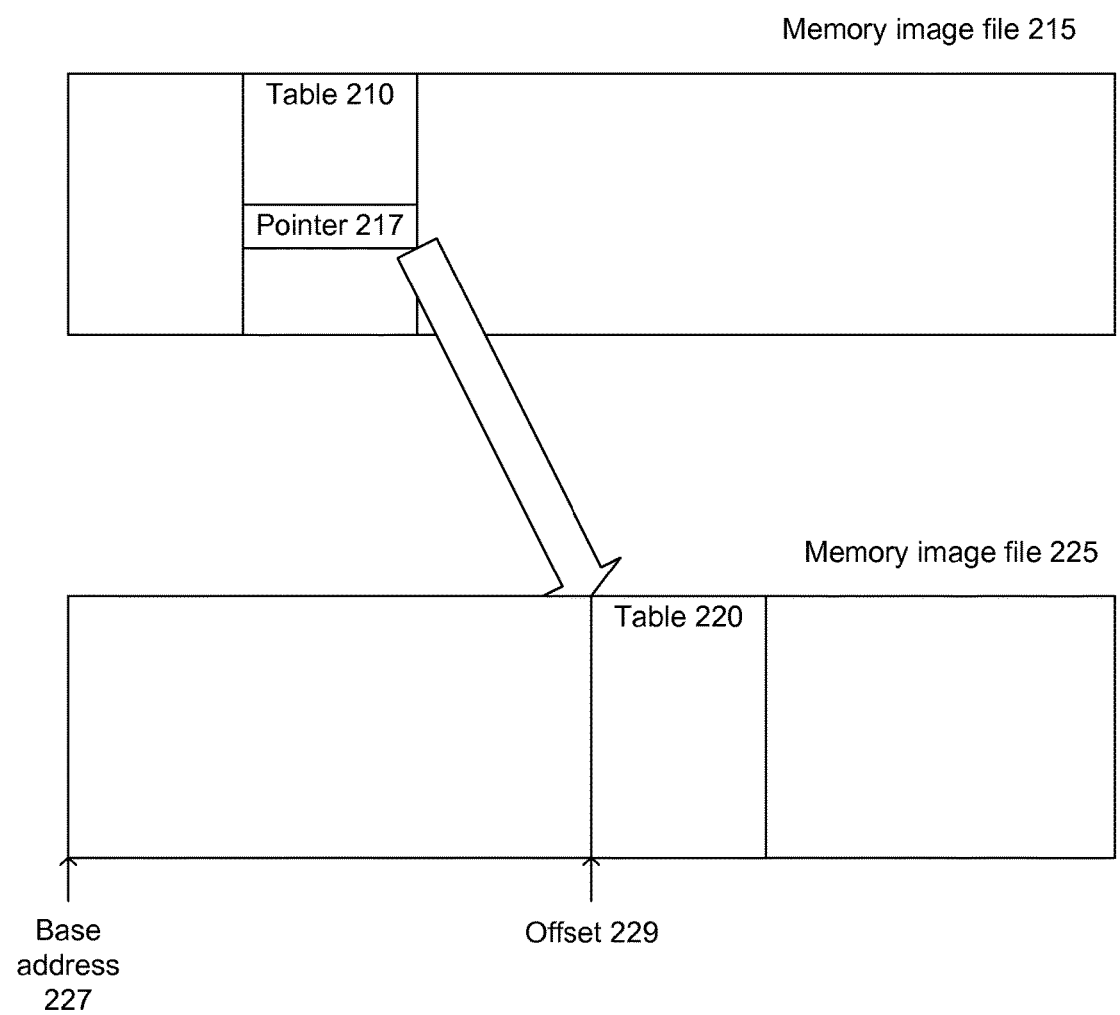
FIG. 2 schematically illustrates an example of resolving an inter-table reference by a linker script produced by the configuration table manager, in accordance with one or more aspects of the present disclosure.

The linker script may further comprise one or more instructions to resolve inter-table references in view of the base addresses of the memory buffers allocated to store the configuration tables. In an example schematically illustrated by FIG. 2, system configuration table 210 packaged into memory image file 215 comprises a pointer 217 to system configuration table 220, the latter being packaged into memory image file 225. The linker script associated with the memory image files may comprise an instruction to substitute pointer 217 with the sum of base address 227 of the memory buffer storing memory image file 225 in the memory of the virtual machine and offset 229 of system configuration table 220 in memory image file 225.

As noted herein above, a configuration table may comprise a checksum of the table contents. Hence, modifying one or more pointers contained by a configuration table may invalidate the checksum. The linker script may comprise one or more instructions to adjust the table checksum values to reflect the modified inter-table pointers. In the illustrative example of FIG. 2, the linker script may comprise instructions to subtract, from the checksum, base address 227 of the memory buffer storing memory image file 225 in the memory of the virtual machine. In certain implementations, the checksum may be represented by a multi-byte value (e.g., a 4-byte value), and hence the linker script may comprise multiple instructions to perform byte subtraction, from a byte of the checksum, the corresponding byte of base address 227 of the memory buffer.

Upon generating the linker script, host computer system 100 may make the memory image files and the associated linker script available to a virtual machine, e.g., by placing the memory image files in a file system exposed to the virtual machine. In an illustrative example, the memory image files and the associated linker script may be placed into a pre-defined directory of the virtual machine's file system. Upon startup, the virtual machine may execute the linker script to load the system configuration tables.

Figure 3:
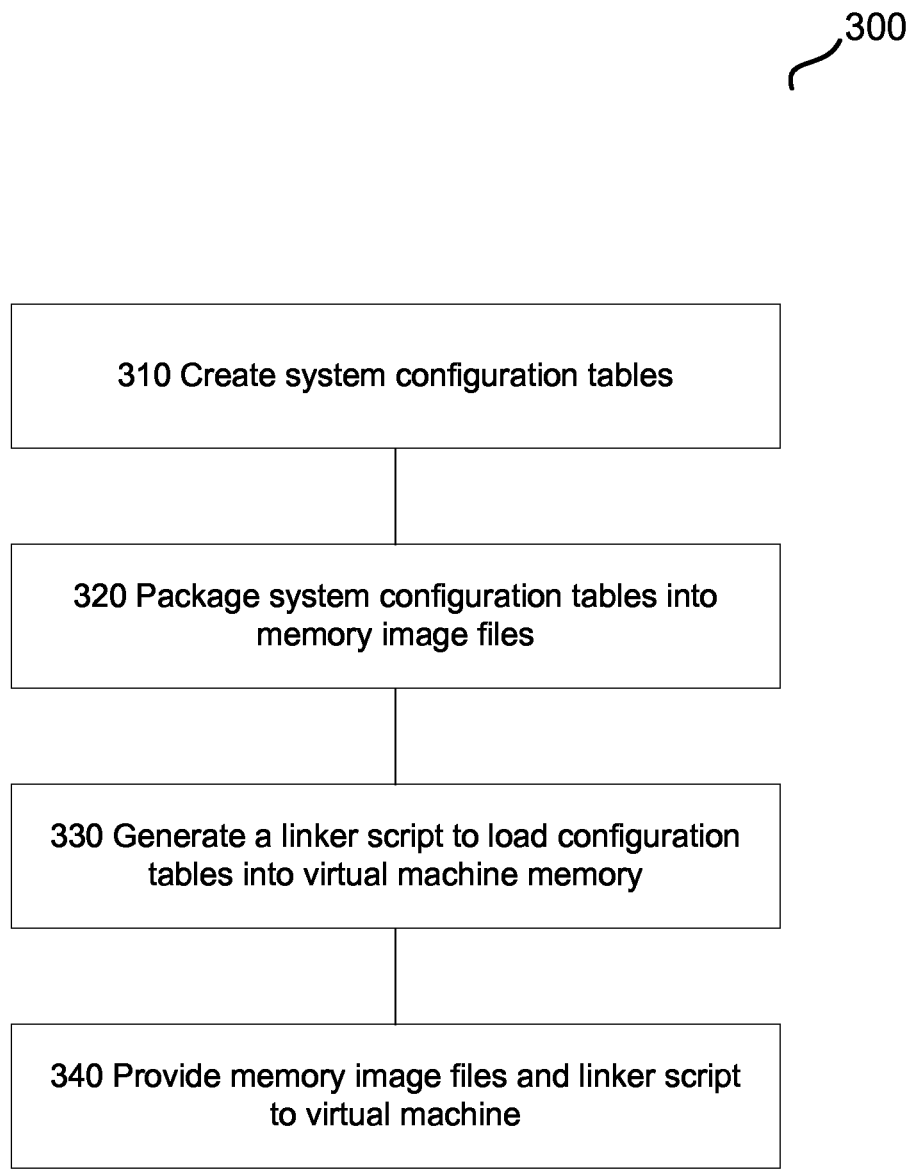
FIG. 3 depicts a flow diagram of an example method for using linker scripts for loading system configuration tables, in accordance with one or more aspects of the present disclosure.

FIG. 3 depicts a flow diagram of an example method 300 for using linker scripts for loading system configuration tables. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more physical processors of the computer system executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a host computer system may create one or more system configuration tables for one or more virtual machines executed by the host computer system. In an illustrative example, the system configuration tables may be provided by ACPI tables. As noted herein above, the system configuration tables may reflect the hardware configuration of the host computer system, including the memory configuration, the I/O devices, the Peripheral Component Interconnect (PCI) bus configuration, etc. The system configuration tables may further reflect the configuration of the hardware to be exposed to the virtual machine, when such configuration is different from the hardware configuration of the host computer system executing the virtual machine (for example, certain processors, physical memory ranges, and/or I/O devices of the host computer system may be excluded from the hardware configuration exposed to a virtual machine). The system configuration tables may further reflect the current values of configuration parameters of the hardware devices exposed to a particular virtual machine, the hardware device orderings and/or priorities, etc.

The host computer system may populate one or more entries of the system configuration tables in view of the hardware configuration (e.g., by storing an identifier of a hardware device in a corresponding entry of the system configuration table, storing a current configuration parameter value in a corresponding entry of the system configuration table, etc.).

At block 320, the host computer system may package the system configuration tables into one or more memory image files.

At block 330, the host computer system may generate a linker script to be executed by the virtual machine. The linker script may comprise a plurality of instructions to load the configuration tables into the virtual machine memory, resolve the inter-table references in view of the base addresses of the memory buffers allocated to store the configuration tables, adjust the table checksum values to reflect the modified inter-table pointers, and/or perform other actions, as described in more details herein above.

In an illustrative example, the linker script may comprise one or more instructions to resolve a reference by a first system configuration table to a second system configuration table, e.g., by substituting the reference with the sum of the base address of the memory buffer storing the memory image file comprising the second system configuration table and the offset of the second system configuration table within the memory image file, as described in more details herein above. In another illustrative example, the linker script may comprise one or more instructions to adjust the checksum of the first system configuration table, e.g., by subtracting, from the checksum, the base address of the memory buffer storing the memory image file comprising the second system configuration table, as described in more details herein above.

At block 340, the host computer system may provide the memory image files and the associated linker script to the virtual machine, e.g., by placing the memory image files and the linker script into a file system exposed to the virtual machine, as described in more details herein above. Responsive to completing the operations schematically referenced by block 340, the method may terminate.

Figure 4:
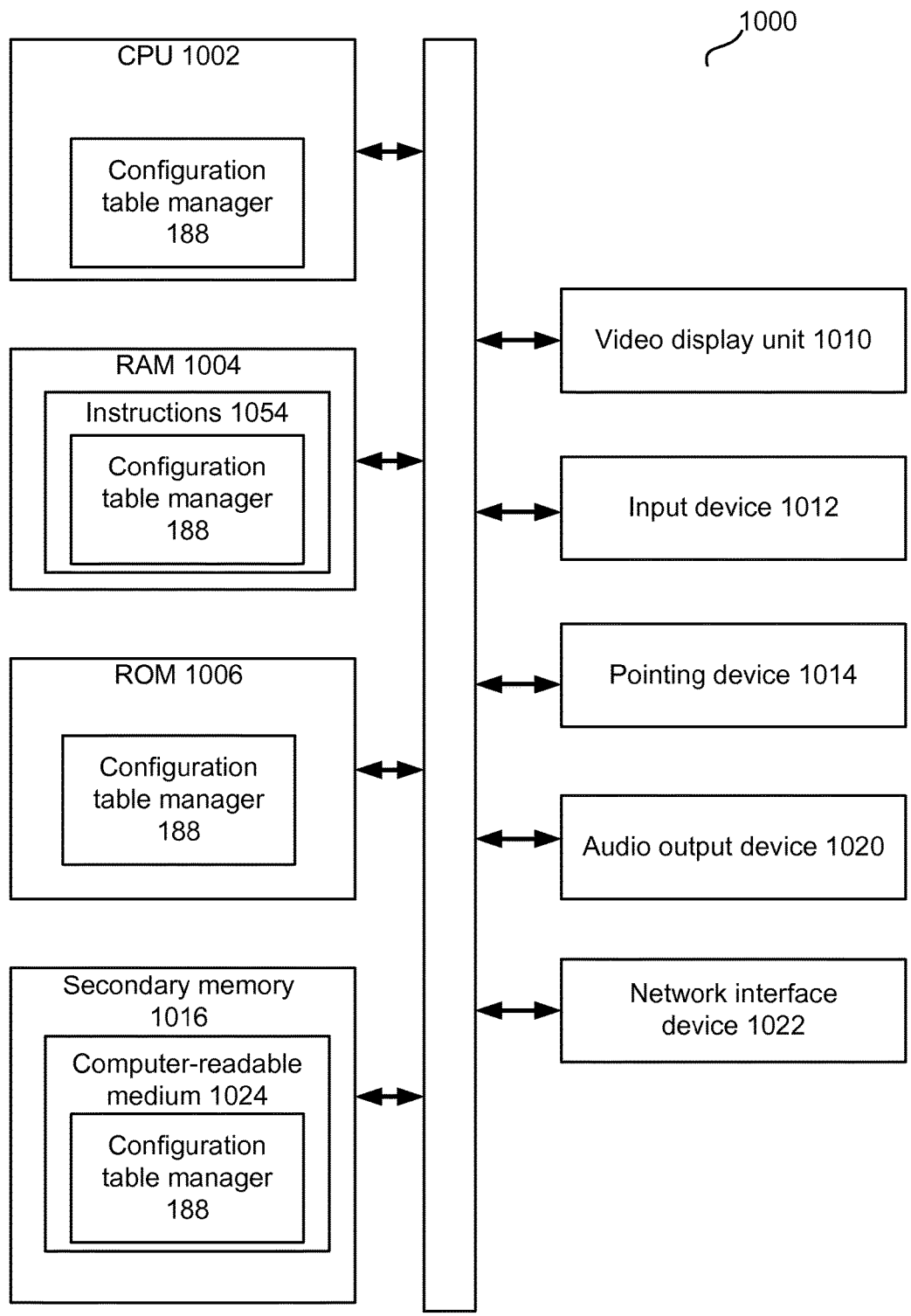
FIG. 4 depicts a block diagram of an illustrative computer system operating in accordance with examples of the invention.

FIG. 4 depicts an example computer system 1000 which can perform any one or more of the methods described herein. In illustrative example, computer system 1000 may correspond to computer system 100 of FIG. 1.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface controller 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions 1054 encoding any one or more of the methods or functions described herein, including instructions encoding configuration table manager 188 of FIG. 1 implementing method 300 for using linker scripts for loading system configuration tables.

Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the methods and/or each of their individual functions, routines, subroutines, or operations. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A method comprising:
   packaging, by a processor of a host computer system, a first system configuration table into a first memory image file and a second system configuration table into a second memory image file, wherein the first system configuration table comprises hardware configuration information associated with the host computer system and comprises a reference to the second system configuration table, and wherein the second memory image file comprises an offset of the second system configuration table;
   generating, by the processor, a script comprising:
      a first instruction to load the first memory image file and the second memory image file into a memory buffer associated with a virtual machine being executed by the host computer system; and
      a second instruction to, responsive to loading the first memory image file and responsive to loading the second memory image file to the memory buffer, wherein the memory buffer is identified by a base address, update the reference of the first system configuration table to reflect where the second system configuration table is loaded in the memory buffer in view of the base address of the memory buffer and the offset of the second system configuration table in the second memory image file;
      a third instruction to adjust a checksum of the first system configuration table to reflect updating of the reference, wherein the third instruction further comprises a fourth instruction to subtract, from the checksum, the base address; and
   providing the first memory image file, the second memory image file, and the script to the virtual machine.

2. The method of claim 1, wherein at least one of the first system configuration table or the second system configuration table is provided by an Advanced Configuration and Power Interface (ACPI) table.

3. The method of claim 1, wherein providing the first memory image file, the second memory image file, and the script to the virtual machine comprises placing the first memory image file, the second memory image file, and the script into a file system exposed to the virtual machine.

4. The method of claim 1, wherein the packaging comprises generating at least one of the first system configuration table or the second system configuration table in view of a hardware configuration of the host computer system.

5. The method of claim 1, wherein the second instruction comprises a fifth instruction to substitute the reference with the base address incremented by the offset of the second system configuration table within the memory buffer.

6. The method of claim 1, wherein the first instruction defines a memory zone for loading at least one of the first configuration table or the second configuration table.

7. The method of claim 1, wherein the first instruction defines an address alignment for loading at least one of the first configuration table or the second configuration table.

8. A host computer system comprising:
   a memory; and
   a processor, operatively coupled to the memory, to:
      package a first system configuration table into a first memory image file and a second system configuration table into a second memory image file, wherein the first system configuration table comprises hardware configuration information associated with the host computer system and comprises a reference to the second system configuration table, and wherein the second memory image file comprises an offset of the second system configuration table;
   generate a script comprising:
      a first instruction to load the first memory image file and the second memory image file into a memory buffer associated with a virtual machine being executed by the host computer system;
      a second instruction to, responsive to loading the first memory image file and responsive to loading the second memory image file to the memory buffer, wherein the memory buffer is identified by a base address,
      update the reference of the first system configuration table to reflect where the second system configuration table is loaded in the memory buffer in view of the base address of the memory buffer and the offset of the second system configuration table in the second memory image file;

a third instruction to adjust a checksum of the first system configuration table to reflect updating of the reference, wherein the third instruction further comprises a fourth instruction to subtract, from the checksum, the base address; and provide the first memory image file, the second memory image file, and the script to the virtual machine.

9. The system of claim 8, wherein to package the first system configuration table and the second system configuration table, the processor is to generate at least one of the first system configuration table or the second system configuration table in view of a hardware configuration of the computer system.

10. The system of claim 8, wherein the second instruction comprises a fifth instruction to substitute the reference with the base address incremented by the offset of the second system configuration table within the memory buffer.

11. A computer-readable non-transitory storage medium comprising executable instructions that, when executed by a processor of a host computer system, cause the processor to:

package, by the processor, a first system configuration table into a first memory image file and a second system configuration table into a second memory image file, wherein the first system configuration table comprises hardware configuration information associated with the host computer system and comprises a reference to the second system configuration table, and wherein the second memory image file comprises an offset of the second system configuration table;

generate, by the processor, a script comprising:

a first instruction to load the first memory image file and the second memory image file into a memory buffer associated with a virtual machine being executed by the host computer system;

a second instruction to, responsive to loading the first memory image file and responsive to loading the second memory image file to the memory buffer, wherein the memory buffer is identified by a base address, update the reference of the first system configuration table to reflect where the second system configuration table is loaded in the memory buffer in view of the base address of the memory buffer and the offset of the second system configuration table in the second memory image file;

a third instruction to adjust a checksum of the first system configuration table to reflect updating of the reference, wherein the third instruction further comprises a fourth instruction to subtract, from the checksum, the base address; and provide the first memory image file, the second memory image file, and the script to the virtual machine.

12. The computer-readable non-transitory storage medium of claim 11, wherein at least one of the first system configuration table or the second system configuration table is provided by an Advanced Configuration and Power Interface (ACPI) table.

13. The computer-readable non-transitory storage medium of claim 11, further comprising executable instructions causing the processor to generate at least one of the first system configuration table or the second system configuration table in view of a hardware configuration of the computer system.

14. The computer-readable non-transitory storage medium of claim 11, wherein the second instruction comprises a fifth instruction to substitute the reference with the base address incremented by the offset of the second system configuration table within the memory buffer.

* * * * *